US009945422B2

United States Patent
Tanimoto et al.

(10) Patent No.: US 9,945,422 B2
(45) Date of Patent: Apr. 17, 2018

(54) ROLLING BEARING APPARATUS

(71) Applicant: JTEKT CORPORATION, Osaka-shi, Osaka (JP)

(72) Inventors: Kiyoshi Tanimoto, Kashiwara (JP); Boyko Stoimenov, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/581,102

(22) Filed: Apr. 28, 2017

(65) Prior Publication Data

US 2017/0328409 A1    Nov. 16, 2017

(30) Foreign Application Priority Data

May 11, 2016    (JP) .................. 2016-095321

(51) Int. Cl.
*F16C 33/66* (2006.01)
*F16C 19/06* (2006.01)

(52) U.S. Cl.
CPC .......... *F16C 33/6659* (2013.01); *F16C 19/06* (2013.01); *F16C 33/6648* (2013.01)

(58) Field of Classification Search
CPC .................................................. F16C 33/6659
See application file for complete search history.

(56) References Cited

U.S. PATENT DOCUMENTS

| 4,343,378 A * | 8/1982 | Bremer ............... F16C 33/6659 |
| | | 139/1 R |
| 9,624,978 B2 * | 4/2017 | Ito ....................... F16C 33/6607 |
| 2016/0025138 A1 | 1/2016 | Watanabe |
| 2016/0025141 A1 | 1/2016 | Tanimoto |

FOREIGN PATENT DOCUMENTS

| JP | 2004-108388 A | 4/2004 |
| JP | 2006-194406 A | 7/2006 |
| JP | 2016-023757 A | 2/2016 |
| JP | 2016-023759 A | 2/2016 |

\* cited by examiner

*Primary Examiner* — Thomas R Hannon
(74) *Attorney, Agent, or Firm* — Oliff PLC

(57) ABSTRACT

A rolling bearing apparatus includes: a bearing including an inner ring, an outer ring, a plurality of balls, and a cage; and an oil supply unit provided axially adjacent to the bearing. The oil supply unit includes a tank in which to accumulate lubricant, and a pump that receives the lubricant in the tank and supplies the lubricant to the bearing. The tank is provided with a holding material for the lubricant, the holding material having minute pores. The holding material includes a first holding portion provided in a region on an outlet-side of the tank, and a second holding portion provided in a part other than the region and having a porosity higher than that of the first holding portion.

6 Claims, 2 Drawing Sheets

ROLLING BEARING APPARATUS

INCORPORATION BY REFERENCE

The disclosure of Japanese Patent Application No. 2016-095321 filed on May 11, 2016 including the specification, drawings and abstract is incorporated herein by reference in its entirety.

BACKGROUND

1. Technical Field

The present disclosure relates to a rolling bearing apparatus including a bearing, and an oil supply unit provided axially adjacent to the bearing.

2. Description of Related Art

In recent years, speedup of a main spindle has been requested to various machine tools for improvement of machining efficiency and production efficiency. When the main spindle rotates at a high speed, a lubricating ability in particular becomes a problem in terms of a bearing that supports the main spindle. In view of this, there has been proposed a rolling bearing apparatus provided in an oil supply unit axially adjacent to the bearing (see Japanese Patent Application Publication No. 2004-108388 (JP 2004-108388 A)). The oil supply unit includes a tank into which lubricant is accumulated, a pump configured to discharge the lubricant in the tank to an annular space between an inner ring and an outer ring, and so on.

SUMMARY

In such a rolling bearing apparatus, the tank into which the lubricant is accumulated and the bearing are provided in a small annular space between a spindle and a housing, so the capacity of the tank is limited. Accordingly, in order to cause the oil supply unit to function for a long period, it is necessary to restrain excessive supply (wasteful consumption) of the lubricant.

However, in the conventional configuration, only the lubricant is filled into an internal space of the tank, and therefore, particularly in a state where the tank is filled with the lubricant, more lubricant than expected flows to the pump from the tank due to a potential energy of the lubricant, which may result in that the lubricant is consumed in vain. In this case, the oil supply unit cannot function for a long period, which increases the frequency of maintenance, and in a case of a machine tool, for example, production efficiency is reduced.

In view of this, the present disclosure provides a rolling bearing apparatus that can restrain a more-than-expected amount of lubricant accumulated in a tank from flowing into a pump due to a potential energy.

A rolling bearing apparatus of an aspect of the present disclosure includes: a bearing including an inner ring, an outer ring, a plurality of rolling elements provided between the inner ring and the outer ring, and a cage holding the plurality of rolling elements; and an oil supply unit provided axially adjacent to the bearing and including a tank in which lubricant is to be accumulated, and a pump that receives the lubricant from the tank and supplies the lubricant to the bearing. The tank is provided with a holding material for holding the lubricant. The holding material has minute pores. The holding material includes a first holding portion provided in a region on an outlet side of the tank, and a second holding portion provided in a region other than the region on the outlet side and having a porosity higher than that of the first holding portion.

With the rolling bearing apparatus, the lubricant in the tank is held in the holding material, thereby making it possible to restrain a more amount of the lubricant than expected from flowing to the pump due to a potential energy. Note that the porosity of the holding material should be high in order to secure a large capacity of the tank (a capacity to accumulate the lubricant in the tank). However, in this case, the lubricant is easily affected by the potential energy. In this regard, if the whole holding material is formed to have a low porosity, the lubricant can be hardly affected by the potential energy, but the capacity of the tank decreases. In view of this, with the rolling bearing apparatus of the present disclosure, the first holding portion having a low porosity is provided on the outlet side of the tank, so that an amount of consumption of the lubricant in the tank can be hardly affected by the potential energy of the lubricant in the tank. Further, since the second holding portion having a high porosity is provided in the region other than the region on the outlet side, it is possible to prevent a decrease in the capacity of the tank. As a result, even if the capacity of the tank is limited, excessive consumption of the lubricant is prevented and it is possible to cause the oil supply unit to function for a long period.

Further, the holding material may be made of a porous element. This makes it possible to infiltrate the lubricant into the porous element in the tank so as to hold the lubricant therein. Further, the first holding portion may have an average pore diameter smaller than that of the second holding portion. Hereby, the amount of consumption of the lubricant in the tank can be hardly affected by the potential energy of the lubricant in the tank, and the first holding portion can function as a strainer. Further, a volume occupied by the second holding portion may be larger than a volume occupied by the first holding portion. This makes it possible to raise a function to increase the capacity of the tank.

Further, the outlet of the tank and an oil chamber included in the pump may be connected to each other by a passage where the lubricant freely flows from the outlet to the oil chamber. That is, a check valve having a function to prevent the lubricant from freely flowing from the tank to the pump is not provided between the outlet of the tank and the oil chamber of the pump. Because of this, the function of the holding material is particularly effective.

Further, a height position of an oil level of the lubricant filled into the tank may be set to be equal to or lower than an upper end of the holding material. Hereby, the influence of the potential energy of the lubricant in the tank to the amount of consumption of the lubricant can be lowered still more.

According to the aspect of the present disclosure, the lubricant in the tank is held in the holding material, thereby making it possible to restrain a more amount of the lubricant than expected from flowing to the pump due to the potential energy and to cause the oil supply unit to function for a long period.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
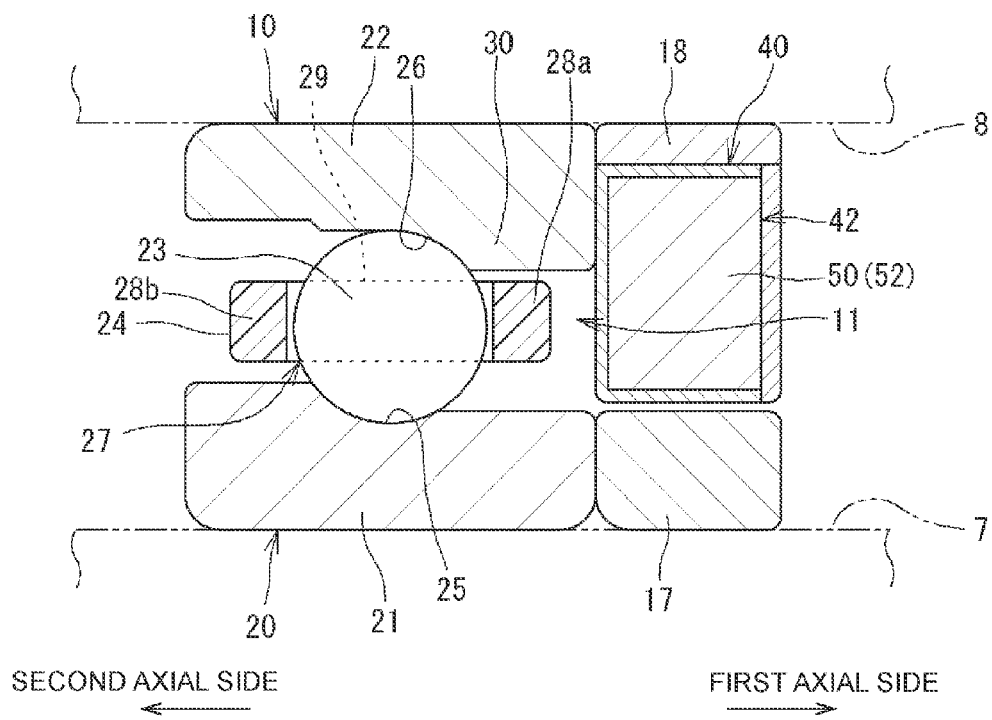
FIG. 1 is a sectional view illustrating one embodiment of a rolling bearing apparatus.

The following describes one embodiment of a rolling bearing apparatus of the disclosure. FIG. 1 is a sectional view illustrating one embodiment of the rolling bearing apparatus. The rolling bearing apparatus 10 (hereinafter also referred to as the bearing apparatus 10) illustrated in FIG. 1 rotatably supports a main spindle (a spindle 7) of a main spindle device included in a machine tool and is accommodated in a bearing housing 8 of the main spindle device. In FIG. 1, the spindle 7 and the bearing housing 8 are indicated by an alternate long and two short dashes line. Note that the bearing apparatus 10 is also applicable to a device other than the machine tool. Further, in the following description, a direction parallel to a center line C of the bearing apparatus 10 is referred to as an axial direction and a direction perpendicular to the axial direction is referred to as a radial direction.

The bearing apparatus 10 includes a bearing 20 and an oil supply unit 40. The bearing 20 includes an inner ring 21, an outer ring 22, a plurality of balls (rolling elements) 23, and a cage 24 holding the plurality of balls 23, so as to constitute a ball bearing (a rolling bearing). Further, the bearing apparatus 10 includes a cylindrical inner ring spacer 17 and a cylindrical outer ring spacer 18.

The oil supply unit 40 is toric as a whole and is attached to a radially inner side of the outer ring spacer 18, so as to be placed adjacent to the bearing 20 in the axial direction. The oil supply unit 40 has a function to supply oil to the bearing 20. The detailed configuration and function of the oil supply unit 40 will be described later. In the present embodiment, the oil supply unit 40 and the outer ring spacer 18 are provided separately, but may be provided integrally. In this case, the oil supply unit 40 has a function to supply oil and also has a function as the outer ring spacer.

In the present embodiment, the outer ring 22, the outer ring spacer 18, and the oil supply unit 40 are non-rotatably attached to the bearing housing 8, and the inner ring 21 and the inner ring spacer 17 rotate together with the spindle 7. Accordingly, the outer ring 22 serves as a fixed ring that does not rotate and the inner ring 21 serves as a rotating ring that rotates together with the spindle 7.

The inner ring 21 is a cylindrical member outwardly engaging with the spindle 7, and a raceway (hereinafter referred to as an inner ring raceway 25) is formed on its outer periphery. In the present embodiment, the inner ring 21 and the inner ring spacer 17 are provided separately, but may be provided integrally (inseparably), although not illustrated herein. The outer ring 22 is a cylindrical member fixed to an inner peripheral surface of the bearing housing 8, and a raceway (hereinafter referred to as an outer ring raceway 26) is formed on its inner periphery. In the present embodiment, the outer ring 22 and the outer ring spacer 18 are provided separately, but may be provided integrally (inseparably), although not illustrated herein.

The balls 23 are provided between the inner ring 21 and the outer ring 22 so as to roll on the inner ring raceway 25 and the outer ring raceway 26. The cage 24 is annular and a plurality of pockets 27 is formed on the gage 24 along a circumferential direction thereof. The balls 23 and the cage 24 are provided in an annular space 11 formed between the inner ring 21 and the outer ring 22.

The cage 24 is annular as a whole, and includes an annular portion 28a on first axial side (first side of the axial direction) of the balls 23, an annular portion 28b on the second axial side (second side of the axial direction) of the balls 23, and a plurality of bar portions 29 connecting the annular portions 28a, 28b. A space between the annular portions 28a, 28b and between the bar portions 29, 29 adjacent to each other in the circumferential direction serves as the pocket 27, and one ball 23 is accommodated in each pocket 27. With this configuration, the cage 24 can hold the plurality of balls 23 at intervals in the circumferential direction.

The annular portion 28a of the cage 24 on the first axial side (an oil-supply-unit-40 side) can make slide contact with a shoulder 30 of the outer ring 22. Hereby, the cage 24 is radially positioned by the outer ring 22. That is, the bearing 20 is a bearing configured such that the cage 24 is guided by the outer ring (guided by a bearing ring).

The cage 24 is made of resin (e.g., phenolic resin), and the inner ring 21 and the outer ring 22 are made of steel such as bearing steel. The balls 23 may be made of steel such as bearing steel or may be ceramic.

Figure 2:
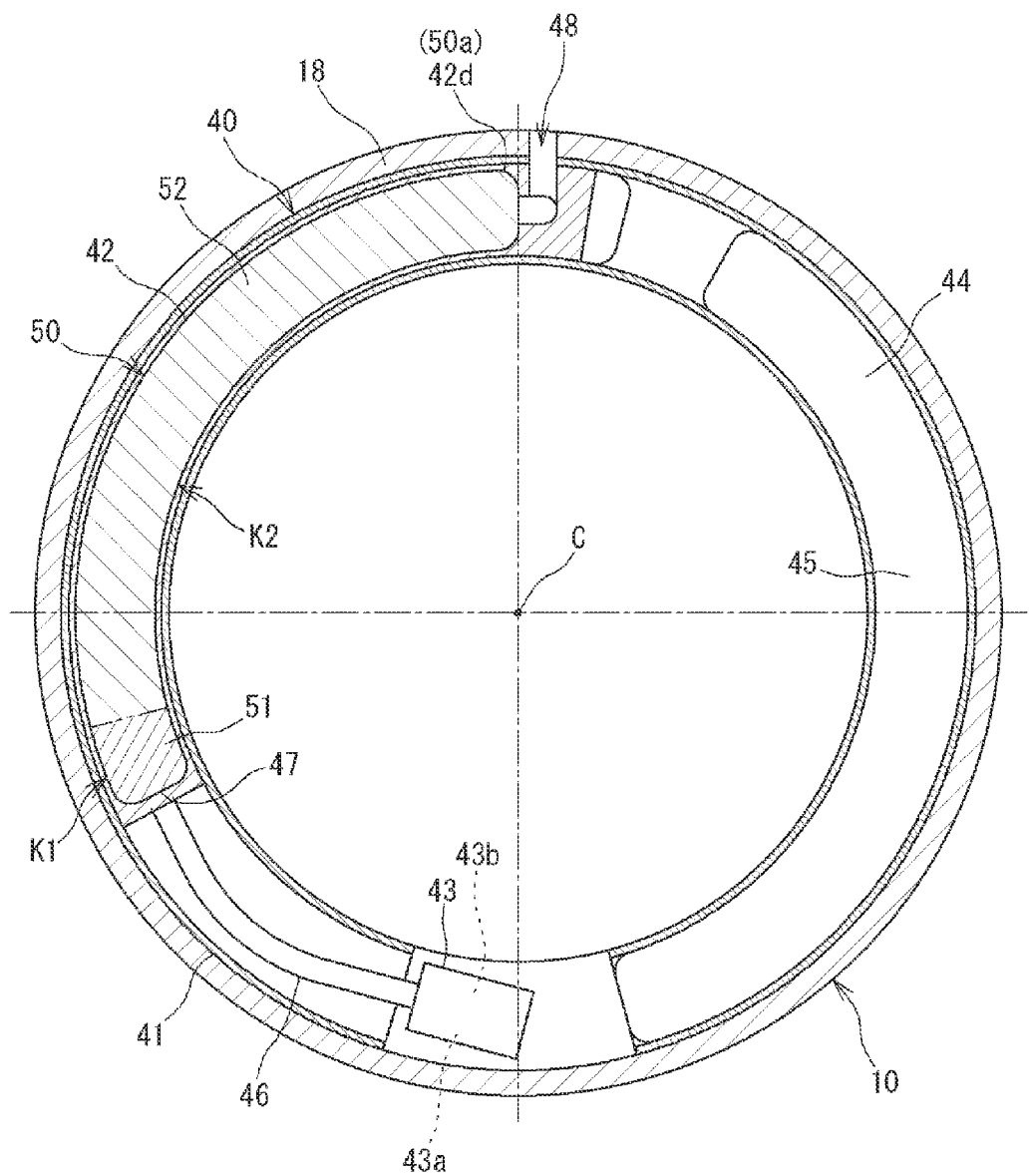
FIG. 2 is a sectional view when an oil supply unit is viewed from an axial direction.

FIG. 2 is a sectional view when the oil supply unit 40 is viewed from the axial direction. The oil supply unit 40 has a toric shape as a whole. The oil supply unit 40 includes a tank 42 and a pump 43. The tank 42 and the pump 43 are provided in an annular body portion 41 included in the oil supply unit 40. Further, the oil supply unit 40 includes a controlling portion 44 and a power supply portion 45, and includes various sensors, although not illustrated herein.

The body portion 41 is attached to an inner peripheral side of the outer ring spacer 18, and has a function as a frame that holds the pump 43 and so on. The body portion 41 is a toric member and has hollow spaces such that the pump 43, the controlling portion 44, and the power supply portion 45 are provided in the hollow spaces. Further, one of the hollow spaces serves as a tank 42. Hereby, the oil supply unit 40 including the body portion 41, the tank 42, the pump 43, the controlling portion 44, the power supply portion 45, and so on is constituted integrally.

In FIG. 2, the tank 42 is provided so as to accumulate lubricant (oil) therein and is connected to the pump 43 via a pipe 46 so that the lubricant flows into the pump 43. A holding material 50 for holding the lubricant is provided in the tank 42. As will be described later, the holding material 50 is constituted by two types of holding portions, i.e., a first holding portion 51 and a second holding portion 52.

The pump 43 includes a piezoelectric element 43a therein, and when the piezoelectric element 43a operates, a volume of an oil chamber (an internal space) 43b of the pump 43 is changed, so that the lubricant in the oil chamber 43b can be discharged into the annular space 11 (see FIG. 1) of the bearing 20. The oil chamber 43b is a space in which to accumulate the lubricant in the pump 43. A nozzle (not shown) provided in the pump 43 is connected to the oil chamber 43b, and is opened toward the axial direction. The lubricant is discharged from the nozzle as an oil droplet at an initial velocity. That is, the oil droplet flies from the nozzle. Thus, the pump 43 is configured such that the oil chamber 43b receives the lubricant of the tank 42 and the lubricant in the oil chamber 43b can be supplied to the bearing 20. One operation of the pump 43 causes a few picoliters to a few nanoliters of the lubricant to be discharged. The power supply portion 45 supplies electric power for the operation of the pump 43. The controlling portion 44 can control a timing to operate the pump 43.

The following describes the holding material 50 in the tank 42. The holding material 50 has many continuous minute pores in its whole area. The holding material 50 of the present embodiment is made of a porous element, and has a continuous porous structure. This makes it possible to infiltrate the lubricant into the holding material 50 made of the porous element in the tank 42 so as to hold the lubricant therein. The holding material 50 made of the porous element of the present embodiment is constituted by a block made of synthetic resin (e.g., PVA: polyvinyl alcohol). Note that the porous element is not limited to synthetic resin, and may be made of ceramic or the like.

The tank 42 has a circular arc shape formed to be elongated along a circumferential direction. On this account, the holding material 50 also has a circular arc shape corresponding to the shape of the tank 42. An end portion of the tank 42 on one side in a longitudinal direction is provided with an outlet 47 from which the lubricant is discharged, and an end portion thereof on the other side in the longitudinal direction is provided with a supply port 48 through which the lubricant is refilled for maintenance or the like. In a case where the bearing apparatus 10 including the oil supply unit 40 is used with the center line C being set horizontally, the outlet 47 is placed at a lower position in the tank 42. The supply port 48 is placed at an upper position. Further, the pump 43 is provided at the lower position, and the tank 42 is provided at the upper position relative to the pump 43. Particularly, the oil chamber 43b of the pump 43 is provided at a lower position relative to the outlet 47 of the tank 42.

On this account, the lubricant in the tank 42 can be directed toward the outlet 47 due to deadweight. Note that, in the tank 42, the lubricant is infiltrated into the holding material 50, so a flow toward the outlet 47 is limited. The lubricant flowing through the outlet 47 is supplied to the oil chamber 43b of the pump 43. An air escape hole is formed in the tank 42, although not illustrated herein. In the present embodiment, the supply port 48 communicates with a top portion of the oil supply unit 40. The escape hole is provided in the top portion of the oil supply unit 40, and the escape hole and the supply port 48 are placed side by side in the axial direction.

The tank 42 is provided with two types of porous elements as the holding material 50. That is, the holding material 50 includes the first holding portion 51 and the second holding portion 52 having characteristics different from each other. The second holding portion 52 has a porosity higher than that of the first holding portion 51. The first holding portion 51 is provided in a region K1 on an outlet-47 side of the tank 42, and the second holding portion 52 is provided in a region K2, which is other than the region K1 on the outlet-47 side of the tank 42. The first holding portion 51 and the second holding portion 52 are provided adjacent to each other, and a border therebetween is indicated by an alternate long and two short dashes line in FIG. 2. The region K1 is narrower than the region K2. That is, the first holding portion 51 is provided only in the vicinity of the outlet 47, and the second holding portion 52 occupies most of the tank 42.

The first and second holding portions 51, 52 are each made of a porous element. For example, the first holding portion 51 can be made of an AC sponge (average pore diameter: 15 micrometers, porosity: 75%) manufactured by A.C. CHEMICAL, Inc., and the second holding portion 52 can be made of AION PVA Sponge A-type ("Beruita" A-series: registered trademark as "Beruita") (average pore diameter: 80 micrometers, porosity: 89%) manufactured by AION Co., Ltd. The holding portions 51, 52 can be in a state where the lubricant corresponding to 50% or more of a volume thereof is absorbed (infiltrated) therein.

The first holding portion 51 has an average pore diameter smaller than that of the second holding portion 52. That is, the first holding portion 51 has a closer continuous porous structure than that of the second holding portion 52. Further, it is preferable that the average pore diameter of the first holding portion 51 be smaller than a nozzle diameter of the pump 43. The nozzle diameter is 25 micrometers, for example. Hereby, in terms of a passage for the lubricant from the region K1 on the outlet-47 side of the tank 42 to the nozzle of the pump 43, the pores of the first holding portion 51 are minimum, so that the lubricant cannot naturally flow out from the nozzle of the pump 43 due to a surface tension of the lubricant. The lubricant does not naturally flow out from the nozzle of the pump 43 due to the surface tension of the lubricant, but the lubricant is discharged from the pump 43 on the condition that the pump 43 is driven, such that the lubricant is automatically refilled into the pump 43 from the tank 42 due to this discharge. The average pore diameter of the second holding portion 52 may be smaller than the nozzle diameter of the pump 43, or may be made larger than the nozzle diameter. It is preferable that the average pore diameter of the second holding portion 52 be rather large, and hereby, an amount of the lubricant that can be accumulated in the second holding portion 52 can be increased.

The second holding portion 52 has a porosity higher than that of the first holding portion 51. Hereby, the amount of the lubricant that can be accumulated can be increased in the region K2 occupied by the second holding portion 52. In the present embodiment, the porosity is 89%, but can be 90% or more.

A volume (that is, the region K2) occupied by the second holding portion 52 is larger (wider) than a volume (that is, the region K1) occupied by the first holding portion 51. The volume occupied by the second holding portion 52 can be 90% or more of the whole tank 42 (a whole space constituting the tank 42), and the remaining volume is a volume occupied by the first holding portion 51. With the configuration of such a holding material 50, the volume of the tank 42, that is, the amount of the lubricant that can be accumulated in the tank 42 can be increased.

As described above, with the bearing apparatus 10 of the present embodiment, the holding material 50 having minute pores is provided in the tank 42, and the holding material 50 includes the first holding portion 51 provided in the region K1 on the outlet-47 side of the tank 42, and the second holding portion 52 provided in a part other than the region K1. The porosity of the second holding portion 52 is higher than the porosity of the first holding portion 51. With the bearing apparatus 10, the lubricant of the tank 42 is held in the holding material 50 (the holding portions 51, 52), thereby making it possible to restrain a more-than-expected amount of the lubricant from flowing to the pump 43 due to a potential energy of the lubricant.

Note that the porosity of the holding material 50 should be high in order to secure a large capacity of the tank 42 (a capacity to accumulate the lubricant in the tank 42). However, in this case, even if the holding material 50 is provided, an amount of consumption of the lubricant is easily affected by the potential energy of the lubricant in the tank 42. In this regard, if the whole holding material 50 is formed to have a low porosity, the amount of consumption of the lubricant can be hardly affected by the potential energy, but the capacity of the tank 42 decreases. In view of this, in the present embodiment, the first holding portion 51 having a low porosity is provided on the outlet-47 side of the tank 42, so that the amount of consumption of the lubricant in the tank 42 can be hardly affected by the potential energy of the lubricant in the tank 42. Since the second holding portion 52 having a high porosity is provided in the region K2 provided in a part other than the outlet-47 side, it is possible to infiltrate much lubricant into the second holding portion 52 and to prevent the decrease in the capacity of the tank 42. As a result, even if the capacity of the tank 42 is limited, that is, even if the capacity is small, excessive consumption of the lubricant is prevented in the oil supply unit 40 and it is possible to cause the oil supply unit 40 to function for a long period. Particularly, in the present embodiment, the tank 42 is elongated, and one side (the outlet-47 side) thereof in the longitudinal direction is placed on the lower position and the other side thereof in the longitudinal direction is placed on the upper position, and therefore, the lubricant to flow out from the tank 42 is easily affected by the potential energy. However, according to the present embodiment, this influence can be weakened, which can contribute to effective use of the lubricant. As a result, in a case where the bearing apparatus 10 is used as a main shaft bearing for a machine tool, maintenance is not required for a long period, which can contribute to improvement of production efficiency.

Further, in the present embodiment, the first holding portion 51 and the second holding portion 52 included in the holding material 50 are made of respective porous elements, and the first holding portion 51 has an average pore diameter smaller than that of the second holding portion 52. On this account, the amount of consumption of the lubricant in the tank 42 can be hardly affected by the potential energy of the lubricant in the tank 42, and the first holding portion 51 can be caused to function as a strainer. On this account, the lubricant supplied to the bearing 20 from the pump 43 can hardly include a foreign matter, thereby making it possible to obtain a preferable lubrication property. The second holding portion 52 has a porosity higher than that of the first holding portion 51, and the volume occupied by the second holding portion 52 is larger than the volume occupied by the first holding portion 51, which makes it possible to increase the capacity of the tank 42.

Further, as illustrated in FIG. 2, the holding material 50 is provided in the entire region of the tank 42. The supply port 48 is connected to the tank 42 at a position slightly lower than an upper surface (a highest top portion) 42*d* of the tank 42. For example, the lubricant is refilled from the supply port 48 for maintenance of the bearing apparatus 10, but a height position of an oil level of the lubricant thus refilled into the tank 42 is set to be not higher than the upper end 50*a* of the holding material 50. In the present embodiment, the upper surface 42*d* of the tank 42 corresponds to the upper end 50*a* of the holding material 50. Hereby, the influence of the potential energy of the lubricant in the tank 42 to the amount of consumption of the lubricant can be lowered still more. In a case where the holding material 50 is provided only on a side lower than a position corresponding to a half of the tank 42 in its height direction, a remaining upper half is a space where the holding material 50 is not provided, and this space is also filled with the lubricant, much lubricant may flow out from the tank 42 due to a potential energy of the lubricant in this space. However, in a case where the holding material 50 is provided in the entire region of the tank 42 and the height of the oil level in the tank 42 is not higher than the upper end 50*a* of the holding material 50 like the present embodiment, it is possible to prevent more lubricant than expected from flowing out from the tank 42 due to the potential energy.

Further, in the present embodiment, the tank 42 is connected to the pump 43 via the pipe 46, as described above. A diameter of a passage section of this pipe 46 is predominantly larger than the average pore diameter of the holding material 50. Further, a check valve having a function to prevent the lubricant from freely flowing from the tank 42 to the pump 43 is not provided between the outlet 47 of the tank 42 and the oil chamber 43*b* provided in the pump 43. That is, the outlet 47 of the tank 42 and the oil chamber 43*b* of the pump 43 are connected to each other by a passage where the lubricant can freely flow from the outlet 47 to the oil chamber 43*b*. Because of this, if the holding material 50 is not provided in the tank 42, the lubricant of the tank 42 freely flows toward the pump-43 side. However, the present embodiment restricts this by the holding material 50. That is, the function of the holding material 50 is particularly effective in the oil supply unit 40 not provided with the check valve between the pump 43 and the tank 42.

Note that, in the above embodiment, the holding material 50 is made of a porous element, but may be made other materials, e.g., felt or fabric except for the porous element. The holding material 50 may be a material having minute pores (spaces) dependent on each other (i.e., connected to each other) all over the structure so as to be able to hold the lubricant to be infiltrated therein.

The embodiment described herein is just an example in all respects and are not limitative. That is, the rolling bearing apparatus of the present disclosure is not limited to the embodiment illustrated herein, but may have other embodiments within a scope of the present disclosure. The embodiment deals with a case where the bearing 20 is an angular contact ball bearing. However, the type of the bearing is not limited to this, but may be a deep groove ball bearing, a tapered roller bearing, or a cylindrical roller bearing. Further, the rolling bearing apparatus 10 can be used for a purpose except the main shaft of the machine tool. Further, the above embodiment deals with a case where the center line C of the bearing apparatus 10 is horizontal, but the posture of the bearing apparatus 10 may be other than this. Further, the above embodiment deals with a case where the first holding portion 51 and the second holding portion 52 are provided separately, but may be provided integrally.

What is claimed is:

1. A rolling bearing apparatus comprising:
   a bearing including an inner ring, an outer ring, a plurality of rolling elements provided between the inner ring and the outer ring, and a cage holding the plurality of rolling elements; and
   an oil supply unit provided axially adjacent to the bearing and including a tank in which lubricant is to be accumulated, and a pump that receives the lubricant from the tank and supplies the lubricant to the bearing, wherein:
   the tank is provided with a holding material for holding the lubricant, the holding material having minute pores; and
   the holding material includes a first holding portion provided in a region on an outlet side of the tank, and a second holding portion provided in a region other than the region on the outlet side of the tank and having a porosity higher than that of the first holding portion.

2. The rolling bearing apparatus according to claim 1, wherein
   the holding material is made of a porous element.

3. The rolling bearing apparatus according to claim 1, wherein
   the first holding portion has an average pore diameter smaller than that of the second holding portion.

4. The rolling bearing apparatus according to claim 1, wherein a volume occupied by the second holding portion is larger than a volume occupied by the first holding portion.

5. The rolling bearing apparatus according to claim 1, wherein
the outlet of the tank and an oil chamber of the pump are connected to each other by a passage where the lubricant freely flows from the outlet to the oil chamber.

6. The rolling bearing apparatus according to claim 1, wherein
a height position of an oil level of the lubricant filled into the tank is set to be equal to or lower than an upper end of the holding material.

\* \* \* \* \*